United States Patent [19]

Kaneko et al.

[11] Patent Number: 4,878,972
[45] Date of Patent: Nov. 7, 1989

[54] PROCESS FOR PREPARING TWO-PLY FOAM MOLDED ARTICLES

[75] Inventors: Katsutoshi Kaneko; Toshio Kobayashi; Mitsuru Watari, all of Ichihara, Japan

[73] Assignee: Mitsui Petrochemical Industries, Ltd., Tokyo, Japan

[21] Appl. No.: 233,541

[22] Filed: Aug. 18, 1988

[30] Foreign Application Priority Data

Aug. 20, 1987 [JP] Japan .................................. 62-207628

[51] Int. Cl.$^4$ .......................... B32B 31/20; B32B 5/20
[52] U.S. Cl. ...................................... 156/78; 156/222; 156/224; 428/316.6
[58] Field of Search ................. 156/78, 212, 221, 222, 156/224; 428/316.6

[56] References Cited

U.S. PATENT DOCUMENTS

| | | | |
|---|---|---|---|
| 4,303,456 | 12/1981 | Schmuck et al. | 156/78 |
| 4,476,183 | 10/1984 | Holtrop et al. | 156/78 X |
| 4,569,707 | 2/1986 | Johnson | 156/78 |
| 4,770,730 | 9/1988 | Abe | 156/78 X |

*Primary Examiner*—Robert A. Dawson
*Attorney, Agent, or Firm*—Birch, Stewart, Kolasch & Birch

[57] ABSTRACT

A process for preparing a two-ply foam molded article, characterized by heating a foamable polyolefin sheet which is in its not yet foamed state to form a foamed polyolefin layer, integrally laminating a fabric on one side of the resulting foamed polyolefin layer which is still in a melted and softened state to form a laminate and simultaneously draw-forming the resulting laminate to shape the two-ply foam molded article.

13 Claims, 2 Drawing Sheets

PROCESS FOR PREPARING TWO-PLY FOAM MOLDED ARTICLES

FIELD OF THE INVENTION

The present invention relates to processes for preparing two-ply foam molded articles and more particularly to processes for preparing foamed polyolefin based two-ply foam molded articles which are used as materials for interior automotive trim, upholstery and so forth.

BACKGROUND OF THE INVENTION

Two-ply foam molded articles comprising a fabric such as a nonwoven fabric of polyester, nylon or the like and a foamed polyolefin layer such as a foamed polyproplylene layer provided on the back of said fabric are widely used in automobiles as materials for trunk room, pillar, door trim, floor mat, rear package tray and the like.

Such two-ply foam molded articles as referred to above have heretofore been prepared by integral lamination of a fabric such as a nonwoven fabric and a foamed sheet using an adhesive to obtain a foambacked fabric which is then subjected to draw molding while the foamed sheet is softened by heating. At the time when two-ply foam molded articles are prepared in the manner as mentioned above, however, the draw forming property of such foambacked fabric as mentioned above becomes poor if the heating temperature employed is low, and particularly it is difficult to form the two-ply foam molded article to shape as desired optionally by deep drawing the foambacked fabric having a thicker or thinner portion. On the other hand, if the heating temperature employed is excessively high, it is not possible to obtain two-ply foam molded articles of good quality as foam collapse would occur, though the draw forming of the foambacked fabric can be performed sufficiently. When two-ply foam molded articles of various shapes are prepared by using a foamed sheet and a fabric such as an nonwoven fabric in the manner mentioned above, it was necessary to minutely control the heating temperature to be employed, involving the difficulty in draw forming the foambacked fabric to shape.

Further, in preparing two-ply foam molded articles according to the above-mentioned procedure, the fabric used, such as nonwoven fabric, is also heated directly when the foambacked fabric is subjected to draw forming. On that account, the fluff of the fabric often collapses which deteriorates the appearance of the resulting two-ply foam molded articles.

Furthermore, in preparing tow-ply foam molded article by the above-mentioned procedure, there was also the problem that adhesives must be used for close lamination of a foamed sheet and a fabric, such as a nonwoven fabric.

OBJECT OF THE INVENTION

The present invention is intended to solve such problems associated with the prior art as mentioned above. An object of the present invention is to provide a process for preparing two-ply foam molded articles comprising a fabric such as a nonwoven fabric and a foamed polyolefin layer, wherein a foambacked fabric, even when it has a thicker or thinner portion, is readily draw formed by deep drawing to various shapes as desired, said foambacked fabric being obtained by the integral lamination of a fabric such as a nonwoven fabric and a foamed polyolefin layer without using adhesives and, moreover, the appearance of the resultant two-ply foam molded articles will not be deteriorated by the collapsing of the fluff of a of the fabric such as a nonwoven fabric, due to undesirably excessive heating.

SUMMARY OF THE INVENTION

The process for preparing two-ply foam molded articles of the present invention is characterized in that a foamable polyolefin sheet, while it is not yet foamed, is allowed to foam by heating and immediately thereafter, a fabric is integrally laminated on one side of the resulting foamed polyolefin layer, and simultaneously the resulting foambacked fabric is draw-formed to shape.

According to the process for preparing two-ply foam molded articles of the present invention, because the foamable polyolefin sheet, while it is not yet foamed, is allowed to foam by heating and immediately thereafter the fabric is integrally laminated on one side of the resulting foamed polyolefin layer and simultaneously therewith the resulting foambacked fabric is draw formed to shape. The foambacked fabric even when it has a thicker or thinner portion is easily draw formed, for example, by deep drawing, to shape and, moreover, the fabric such as a nonwoven fabric and the foamed polyolefin layer can be integrally laminated to each other without using adhesives and the appearance of the resulting two-ply foam molded articles will not be deteriorated by a collapse of the fluff of the fabric such as a nonwoven fabric.

DETAILED DESCRIPTION OF THE INVENTION

The process for preparing two-ply foam molded articles of the present invention is illustrated below in detail.

Figure 1:
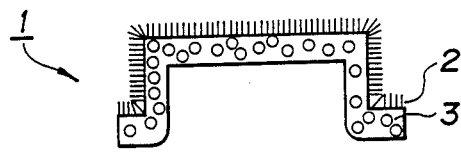
FIG. 1 is a cross-sectional view of the two-ply foam molded article of the present invention.

As shown in the cross-sectional view of FIG. 1, two-ply foam molded article 1 which is prepared in the present invention comprises a fabric of fabric 2 such as a nonwoven fabric and foamed polyolefin layer 3 provided on the back of fabric 2.

Useful materials as fabric 2 usually include nonwoven fabrics of polyester, nylon, polyacrylic ester, polypropylene, etc., by way of illustration but not of limitation. Any materials may be widely used as fabric 2 so long as they are those which have conventionally been used as surface materials of two-ply foam molded articles.

Foamed polyolefin layer 3 which is used as a backing material may be prepared by heating a foamable polyolefin sheet.

Such foamable polyolefin layer 3 as mentioned above may be prepared by molding into the form of sheet a foamable polyolefin composition comprising (A) a polyolefin, (B) a crosslinking agent, (C) a foaming agent and (D) an organic peroxide at a temperature in which neither the foaming agent (C) nor organic peroxide (D) decomposes.

As the polyolefin (A) there is mainly used polyethylene or polypropylene.

(i) Useful polyethylene includes a low density polyethylene LDPE (for example: MFR=7.2 g/10 min, D=0.917 g/cm$^3$) having a melt flow rate (MFR) of 0.5–50 g/10 min, and a high density polyethylene HDPE (for example: MFR=1.2 g/10 min, D=0.9555 g/cm$^3$). Under certain circumstances, there may also be used ethylene/vinyl acetate copolymers containing a small amount, e.g. less than 30% by weight of vinyl acetate based on the composition, or ethylene/propylene/non-conjugated diene copolymers containing small amounts of propylene and non-conjugated diene.

(ii) Useful polypropylene includes a homopolymer of propylene and copolymers of propylene and less than 15 mol % of other α-olefins such as ethylene, 1-butene, 4-methyl-1-pentene, 1-hexene, 1-octene, 1-decene, etc., both having a melt flow rate (MFR: ASTM D 1238, L) of 0.1–50 g/10 min, preferably 0.5–20 g/10 min.

Furthermore, there may also be used the above-mentioned polypropylene in combination with an α-olefin resin selected from 1-butene polymers having the 1-butene content of at least 70 mol % and random copolymers of propylene and α-olefin of 4 to 20 carbon atoms, said random copolymers having a propylene content of 55–85 mol %.

The crosslinking agent (B) for crosslinking polyethylene as the polyolefin mentioned above is preferably used, although the use thereof is not always necessary. Useful crosslinking agent (B) includes unsaturated compounds, oxime compounds, nitroso compounds or maleimide compounds, which have one or two or more double bonds. This crosslinking agent (B) has such a function that by the virtue of reacting with a polymer radical, prior to the cleavage reaction of the polymer radical, said polymer radical being formed by hydrogen withdrawal from the aforesaid polyolefin (A) due to the presence of the aforesaid organic peroxide (D), the crosslinking agent (B) stabilizes the polymer radical while, at the same time, enhances its crosslinking efficiency.

Concrete examples of the crosslinking agent (B) include triallyl cyanurate, triallyl isocyanurate, ethylene glycol dimethacrylate, trimethylolpropane trimethacrylate, pentaerythritol triacrylate, neopentyl glycol diacrylate, 1,6-hexanediol dimethacrylate, oxime compounds such as quinone dioxime and benzoquinone dioxime, paranitroso phenol and N,N-metaphenylene bismaleimide, or mixtures of two or more compounds mentioned above. Of these compounds exemplified above, preferred are neopentyl glycol diacrylate, 1,6-hexanediol dimethacrylate or mixtures thereof.

This crosslinking agent (B) is preferably present in an amount of 0.1–1 part by weight based on 100 parts by weight of the aforesaid polyolefin (A).

The foaming agent (C) used in the foamable composition is a chemical substance which is a liquid or solid at ordinary room temperature and which decomposes on heating to vapor. No particular limitation is placed on such chemical substances as mentioned above, as long as they have a decomposition temperature which is higher than the melting point of the aforesaid polyolefin (A).

Such foaming agent (C) as mentioned above includes azodicarbonamide, barium azodicarboxylate, N,N'-dinitrosopentamethylene tetramine, 4,4-oxybis (benzenesulfonylhydrazide), diphenylsulfone-3,3-disulfonyl hydrazide, p-toluenesulfonyl semicarbazide, trihydrazinotriazine, biurea and zinc carbonate. Of these compounds exemplified above, particularly preferred are azodicarbonamide, N,N-dinitrosopentamethylene tetramine and trihydrazinotriazine, in the point of view that it evolves the gas in high yield and the termination temperature of the gas evolution is sufficiently lower than that where a heat deterioration of the polyolefin (A) starts.

The foaming agent (C) is preferably present in an amount of 5–20 parts by weight based on 100 parts by weight of the aforesaid polyolefin (A).

The organic peroxide (D) used for crosslinking the foamable composition includes mainly organic peroxides and organic peroxy esters. A decomposition temperature employed for obtaining a half-life of one minute of this organic peroxide (D) is preferably higher than a melting point of the aforesaid polyolefin (A).

Concrete examples of the organic peroxide (D) mentioned above include 3,3,5-trimethylhexanoyl peroxide (1), octanoyl peroxide (2), decanoyl peroxide (3), lauroyl peroxide (4), succinic acid peroxide (5), acetyl peroxide (6), tertiary-butylperoxy(2-ethylhexanoate) (7), metatoluoyl peroxide (8), benzoyl peroxide (9), tertiary-butylperoxy isobutyrate (10), 1,1-bis(tertiary-butylperoxy)-3,5,5,-trimethylcyclohexane (11), 1,1-bis(tertiary-butylperoxy)cyclohexane (12), tertiary-butyl-peroxymaleic acid (13), tertiary-butylperoxylaurate (14), tertiary-butylperoxy-3,5,5-trimethycyclohexanoate (15), cyclohexanone peroxide (16), tertiary-butylperoxyisopropyl carbonate (17), 2,5-dimethyl-2,5-di(benzoylperoxy)hexane (18), tertiary-butylperoxyacetate (19), 2,2-bis(tertiary-butylperoxy)butane (20), tertiary-butylperoxy-benzoate (21), n-butyl-4,4-bis(tertiary-butylperoxy)valerate (22), di-tertiary-butylperoxyisophthalate (23), methyl ethyl ketone peroxide (24), α,α'-bis(tertiary-butylperoxyisopropyl)benzene (25), dicumyl peroxide (26), 2,5-dimethyl-2,5-di(tertiary-butylperoxy)hexane (27), tertiary-butylcumyl peroxide (28), diisopropylbenzene hydroperoxide (29), di-tertiary-butyl peroxide (30), para-menthane hydroperoxide (31), 2,5-dimethyl-2,5-di(tertiary-butylperoxy)hexine-3 (32), 1,1,3,3-tetramethylbutyl hydroperoxide (33), 2,5-dimethylhexane-2,5-dihydroperoxide (34), cumene hydroperoxide (35), and tertiary-butyl hydroperoxide (36).

Of the compounds exemplified above, particularly preferred are the compounds (12)–(36).

This organic peroxide (D) is preferably present in an amount of 0.01–2.0 parts by weight based on 100 parts by weight of the aforesaid polyolefin (A).

The foamable composition of the present invention may contain various additives in addition to the above-illustrated components. For instance, it is desirable to incorporate phenol type heat stabilizers of at least 30 carbon atoms into the foamable composition when the components of said composition are kneaded.

Subsequently, the process for preparing two-ply foam molded articles using foam foamable polyolefin composition as mentioned above is illustrated hereinafter.

For forming the foamable polyolefin composition into a sheet, there may be employed therefor a process in which the foamable polyolefin composition containing the above-mentioned components is kneaded with a Brabender mixer or the like and then formed into a sheet with a calendar roll, a process for forming said composition into a sheet with a press molding machine, and a process in which said composition is kneaded with an extruder and then formed into a sheet through a T-die or circular die. Of the processes referred to above, preferred is the last process, that is, a process in which the said composition is kneaded and then extruded through a T-die at a temperature below decomposition temperatures of the foaming agent (C) or the like into the form of sheet, because both energy consumption and time requirement are small, and also the resulting sheet is excellent in flatness as well as in texture after extrusion.

At the time when the foamable polyolefin composition is subjected to sheet forming, it is necessary to employ a sheet forming temperature at which the foaming agent (C) will not decompose, as mentioned previously. Concretely speaking, however, in the case where polyethylene is used as polyolefin and azodicarbonamide is used as a foaming agent, it is desirable that the foamable polyethylene composition is subjected to sheet forming at a temperature of 110°–160° C., preferably about 120°–160° C. Furthermore, in the case where polypropylene is used as polyolefin and azodicarbonamide is used as a foaming agent, it is desirable that the foamable polypropylene composition is subjected to sheet forming at a temperature of 150°–190° C., preferably about 160°–180° C.

The foamable polyolefin sheet as prepared preferably has a thickness of about 0.5–5 mm.

Figure 2:
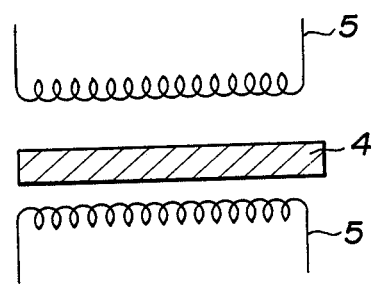
FIGS. 2, 3, 4 and 5 individually illustrate in sequence the steps involved in the process for preparing two-ply foam molded articles of the present invention.
Figure 3:
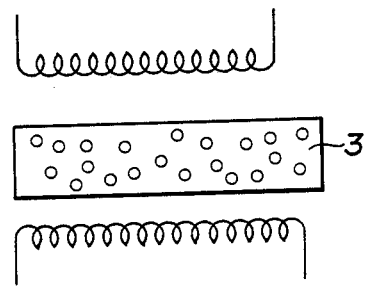
Figure 4:
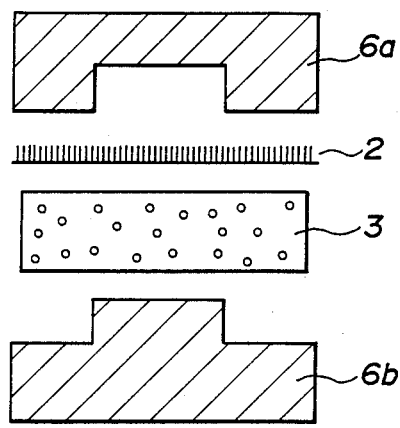
Figure 5:
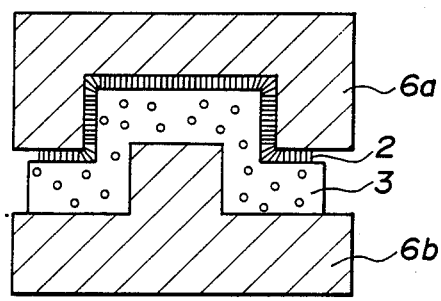

Subsequently, the foamable polyolefin sheet 4 thus obtained while it is not yet foamed is allowed to foam by heating with a ceramic heater 5 or the like of a vacuum molding machine to form foamed polyolefin layer 3 as shown in FIG. 2, and as shown in FIGS. 3, 4 and 5, a fabric of fabric 2 such as a nonwoven fabric is integrally laminated on one side of foamed polyolefin layer 3 while it is still melt and softened to obtain a foambacked fabric and simultaneously therewith the foambacked fabric is drawn by means of a matched male and female press molds 6a and 6b of press molding machine to prepare two-ply foam molded article 1 of the desired shape.

The heating temperature employed at the time when foamable polyolefin sheet 4 which is not yet foamed is allowed to foam must be higher than a decomposition temperature of the foaming agent (C). Concretely speaking, however, it is desirable that the heating temperature to be employed is above 200° C. when azodicarbonamide is used as a foaming agent.

Furthermore, it is desirable that at the time when foamed polyolefin sheet 4 is subjected to press molding, the press molds are maintained at a cooled state without heating and resulting molded foamed polyolefin sheet 4 is cooled to solidify. In this case, the pressing time employed is about 0.1–3 minutes and the resulting two-ply foam molded article is preferably cooled by means of an air spray or the like.

In the two-ply foam molded article obtained by the present invention, foamed polyolefin layer 3 has a thickness of about 1–50 mm, and the foaming ratio is preferably about 2–40 times.

In the case where the foamed polyolefin layer comprises foamed polypropylene, the foamed layer has a density of about 0.1–0.5 g/cm$^3$, and a two-ply foam molded article which is light in weight and has stiffness is obtained. On one hand, when the foamed polyolefin layer comprises foamed polyethylene, the foamed layer has a gravity of about 0.02–0.5 g/cm$^3$, and a two-ply foam molded article therewith which is light in weight and has a softness is obtained.

In the process for preparing two-ply foam molded articles of the present invention as illustrated above, because the fabric of fabric 2 such as a nonwoven fabric is superposed on one side of foamed polyolefin layer 3 which is still melt and softened, followed by press molding, the fabric of fabric 2 such as a nonwoven fabric is impregnated with the surface layer of foamed polyolefin layer 3 and thus foamed polyolefin layer 3 and fabric 2 can be integrally joined together without using adhesives and, moreover, the foambacked fabric thus obtained is easily deep drawn to various shapes, particularly the draw-molding of the foambacked fabric is easily performed even when said foambacked fabric has a thicker or thinner portion.

Furthermore, in the process for preparing two-ply foam molded articles of the present invention, because the fabric of fabric 2 such as a nonwoven fabric and foamed polyolefin layer 3 can integrally be laminated to each other without exposing fabric 2 directly to heat a fabric of fabric 2 such as nonwoven fabric of the resulting two-ply foam molded article will not be injured in its appearance by a collapse of the fluff of said fabric.

EFFECT OF THE INVENTION

In the process for preparing two-ply foam molded articles of the present invention, because a foamable polyolefin sheet while it is not yet foamed is allowed to foam by heating, and immediately thereafter a fabric is integrally laminated on one side of the resulting foamed polyolefin layer and simultaneously therewith the resulting foambacked fabric is subjected to draw molding, the foambacked fabric is easily draw-molded into various shapes even when it has a thicker or thinner portion and, moreover, the integral lamination of a fabric such as a nonwoven fabric and a foamed polyolefin layer without using adhesives. In addition thereto, the fabric such as a nonwoven fabric of the resulting two-ply foam molded article will not be injured in its appearance by a collapse of the fluff of said fabric.

The present invention is illustrated below with reference to examples, but it should be construed that the invention is in no way limited to these examples.

EXAMPLE 1

A foamable polypropylene composition having the following formulation was thoroughly mixed with a Henschel mixer and granulated by means of an extruder of 65 φmm to prepare pellets. The resin temperature employed at that time was 170° C.

| | |
|---|---|
| Polypropylene resin (density 0.91 g/cm$^3$, MFR 2.0 g/10 min) | 80 parts by weight |
| Polybutene-1 resin (density 0.915 g/cm$^3$, MFR 0.03 g/10 min) | 20 parts by weight |
| Crosslinking agent (triallylisocyanurate) | 1.0 part by weight |
| Foaming agent (azodicarbonamide) | 3 parts by weight |
| Organic peroxide (dicumyl peroxide) | 0.1 part by weight |

The pellets thus obtained were fed into a sheet forming machine (a 65 φmm extruder with a die width of 550 mm and a lip opening of 2.0 mm) and processed to prepare a sheet like foamable polypropylene sheet. The sheet forming temperature employed was 170° C., and no foaming of the resin was observed at that time. The sheet thus obtained had a thickness of 1.5 mm.

The foamable polypropylene sheet obtained above was heated for about 2 minutes by means of a ceramic heater of vacuum molding machine to form a foamed polypropylene layer. In that case, the present temperature of the ceramic heater 2 was 400° C., and the surface temperature of the foamable polypropylene sheet was 210° C. Simultaneously with the formation of the foamed polypropylene layer, a nonwoven fabric was applied to one surface of said foamed polypropylene layer. The foamed polypropylene layer to which the nonwoven fabric had been applied was press molded to shape by means of a matched male and female press mold. At that time when the press molding was effected, the press mold was used at an ordinary temperature without being preheated. The pressing time was about 1 minute, and after the completion of the press molding, a two-ply foam molded article was released from the mold and cooled for about 30 seconds by means of an air spray.

The foamed polypropylene layer of the two-ply foam molded articles thus obtained had a thickness of about 6 mm, a density of 0.2 g/cm$^3$, and a foaming ratio of about 4 times.

EXAMPLE 2

| | |
|---|---|
| Polyolefin | Polypropylene 80 parts by weight amorphous polymer consisting essentially 70 mol % of propylene and 30 mol % of 1-butene having MFR(230° C.) = 6 g/10 min and D = 0.89 g/cm$^3$ 20 parts by weight |
| Crosslinking agent | trimethylolpropane trimethacrylate 0.5 pbw |
| Foaming agent | azodicarbonamide 2 pbw |
| Organic peroxide | 2.5-dimethyl-2.5-di(tertiarybutylperoxy) hexane 0.05 pbw |

The ingredients aforementioned were fed into a mixer of the type of Henschel, then mixed at the ambient temperature to form a composition.

The composition was fed into a ventilated sheet forming machine at a resin temperature of of 70° C. described in the Example 1 to prepare a foamable sheet.

The sheet was about 1.2 mm thick in the now-foamed state. This sheet was heated for about 90 seconds by means of a ceramic heater of vacuum molding machine to form a foamed polypropylene layer which had a thickness of about 5 mm, and foaming ratio of about 4 times. The residual operations and conditions were similar to those in the Example 1.

What is claimed is:

1. A process for preparing a two-ply foam molded article, characterized by heating to a melted and softened state a foamable polyolefin sheet which is in its not yet foamed state to form a foamed polyolefin layer, integrally laminating a fabric on one side of the resulting foamed polyolefin layer which is still in a melted and softened state to form a laminate and simultaneously drawforming the resulting laminate to shape the two-ply foam molded article.

2. The process as claimed in claim 1 wherein the foamable polyolefin sheet is formed from a composition comprising (A) a polyolefin, (B) a crosslinking agent, (C) a foaming agent, and (D) an organic peroxide.

3. The process as claimed in claim 1 wherein the polyolefin is polyethylene or polypropylene.

4. The process as claimed in claim 1 wherein the fabric is a nonwoven fabric.

5. The process as claimed in claim 2 wherein the crosslinking agent (B) is an oxime compound, a nitroso compound, a maleimide compound or mixtures thereof.

6. The process as claimed in claim 2 wherein the crosslinking agent (B) is present in an amount of 0.1–1 part by weight based on 100 parts by weight of the polyolefin (A).

7. The process as claimed in claim 2 wherein the foaming agent (C) is azodicarbonamide, barium azodicarboxylate, N,N'-dinitrosopentamethylene tetramine, 4,4-oxybis(benzenesulfonyl-hydrazide), diphenylsulfone-3,3-disulfonyl hydrazide, p-toluene-sulfonyl semicarbazide, trihydrazinotriazine, biurea or zinc carbonate.

8. The process as claimed in claim 2 wherein the foaming agent (C) is azodicarbonamide, N,N-dinitrosopentamethylene tetramine or trihydrazinotriazine.

9. The process as claimed in claim 2 wherein the foaming agent (C) is present in an amount of 5–20 parts by weight based on 100 parts by weight of the polyolefin (A).

10. The process as claimed in claim 2 wherein the organic peroxide (D) is an organic peroxy ester.

11. The process as claimed in claim 2 wherein the organic peroxide (D) is present in an amount of 0.01–2.0 parts by weight based on 100 parts by weight of the polyolefin (A).

12. The process as claimed in claim 1 wherein the foamable polyolefin sheet is heated at a temperature of 110°–160° C.

13. The process as claimed in claim 1 wherein the foamable polyolefin sheet is heated at a temperature of 120°–160° C.

* * * * *